(12) United States Patent
Yoo et al.

(10) Patent No.: US 11,595,796 B2
(45) Date of Patent: Feb. 28, 2023

(54) METHODS AND APPARATUS FOR CV2X COMMUNICATION

(71) Applicant: QUALCOMM Incorporated, San Diego, CA (US)

(72) Inventors: Doosun Yoo, San Diego, CA (US); Aasif Dingankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 16/678,860

(22) Filed: Nov. 8, 2019

(65) Prior Publication Data

US 2021/0144525 A1 May 13, 2021

(51) Int. Cl.
*H04W 4/40* (2018.01)
*H04W 76/25* (2018.01)
*H04L 1/18* (2006.01)
*H04W 80/02* (2009.01)
*H04L 1/1812* (2023.01)

(52) U.S. Cl.
CPC ............. *H04W 4/40* (2018.02); *H04L 1/1819* (2013.01); *H04W 76/25* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 9,967,306 | B1 * | 5/2018 | Zhou | ................... H04L 65/4069 |
| 2009/0067424 | A1 * | 3/2009 | Zhang | ................... H04L 1/1607 |
| | | | | 370/389 |
| 2020/0036644 | A1 * | 1/2020 | Belogolovy | .......... H04L 1/0014 |
| 2020/0137536 | A1 * | 4/2020 | Nguyen | ............... H04W 72/005 |
| 2020/0296622 | A1 * | 9/2020 | Aktas | .................... H04L 1/1819 |
| 2021/0099994 | A1 * | 4/2021 | Park | ...................... H04L 1/1812 |

FOREIGN PATENT DOCUMENTS

| | | |
|---|---|---|
| WO | 2018029023 A1 | 2/2018 |
| WO | 2019139206 A1 | 7/2019 |

OTHER PUBLICATIONS

Mannoni et al. "A Comparison of the V2X Communication Systems: ITS-G5 and C-V2X" IEEE VTC Apr. 28-May 1, 2019 (Year: 2019).*
3GPP TS 36.321 "Medium Access Cortrol (MAC) protocol specification" version 15.7.0 Oct. 2019 (Year: 2019).*
International Search Report and Written Opinion—PCT/US2020/058709—ISA/EPO—dated Feb. 15, 2021.

* cited by examiner

*Primary Examiner* — Basil Ma
(74) *Attorney, Agent, or Firm* — Arent Fox LLP

(57) ABSTRACT

Aspects of the present disclosure include methods, apparatuses, and computer readable media for generating a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks, transmitting the plurality of message blocks to a receiving UE, and transmitting the plurality of redundant blocks to the receiving UE after transmitting the plurality of message blocks.

16 Claims, 9 Drawing Sheets

400

800

805

GENERATING A PLURALITY OF CELLULAR VEHICLE-TO-EVERYTHING (CV2X) MESSAGE SEGMENTS AT A FIRST LAYER BASED ON AN UPPER LAYER MESSAGE AT A SECOND LAYER, WHEREIN EACH MESSAGE SEGMENT OF THE PLURALITY CV2X MESSAGE SEGMENTS INCLUDES A MESSAGE BLOCK OF A PLURALITY OF MESSAGE BLOCKS AND A REDUNDANT BLOCK OF A PLURALITY OF REDUNDANT BLOCKS

810

TRANSMITTING THE PLURALITY OF MESSAGE BLOCKS TO A RECEIVING UE

815

TRANSMITTING THE PLURALITY OF REDUNDANT BLOCKS TO THE RECEIVING UE AFTER TRANSMITTING THE PLURALITY OF MESSAGE BLOCKS

905
RECEIVING A PLURALITY OF CELLULAR VEHICLE-TO-EVERYTHING (CV2X) MESSAGE BLOCKS FROM A TRANSMITTING UE

910
RECEIVING A PLURALITY OF CV2X REDUNDANT BLOCKS FROM THE TRANSMITTING UE

815
GENERATING AN UPPER LEVEL MESSAGE AT A FIRST LAYER BASED ON AT LEAST ON THE PLURALITY OF CV2X MESSAGE BLOCKS OR THE PLURALITY OF CV2X REDUNDANT BLOCKS

*FIG. 9*

METHODS AND APPARATUS FOR CV2X COMMUNICATION

BACKGROUND

Aspects of the present disclosure relate generally to wireless communications, and more particularly, to Cellular Vehicle-to-Everything (CV2X) communications among user equipment (UEs).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In CV2X communication, certain messages relating to road safety and/or sensor information (e.g., Basic Safety Messages) may be time critical. It may be desirable to transmit such messages to the surrounding vehicles with minimal delays. The messages may demand strict latency requirements as decisions made with delayed information may result in harmful situations. As the complexity of the message increases, the message lengths may grow with the increasing geographical points, security certificates, and other extensions. The increase in complexity may require the UEs to transmit the messages in more than one block. For example, when longer messages are presented from the application layer, they may need to be segmented into multiple transport blocks to be compatible with the transmission rules at the medium-access control (MAC) layer based on the available coding and modulation schemes. When the application message is segmented, the message transmission latency may increase in proportion to the number of segmentations and this increase in latency may pose an issue in time-critical road safety situations. Therefore, improvements in transmitting segmented messages may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for generating a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks, transmitting the plurality of message blocks to a receiving UE, and transmitting the plurality of redundant blocks to the receiving UE after transmitting the plurality of message blocks.

Other aspects of the present disclosure include a UE having a memory having instructions, a transceiver, and one or more processors operatively coupled with the memory and the transceiver, the one or more processors configured to execute the instructions to generate a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks, transmit, via the transceiver, the plurality of message blocks to a receiving UE, and transmit, via the transceiver, the plurality of redundant blocks to the receiving UE after transmitting the plurality of message blocks.

An aspect of the present disclosure includes a UE including means for generating a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks, means for transmitting the plurality of message blocks to a receiving UE, and means for transmitting the plurality of redundant blocks to the receiving UE after transmitting the plurality of message blocks.

Some aspects of the present disclosure include non-transitory computer readable media having instructions stored therein that, when executed by one or more processors of a UE, cause the one or more processors to generate a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks, transmit the plurality of message blocks to a receiving UE, and transmit the plurality of redundant blocks to the receiving UE after transmitting the plurality of message blocks.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 is a process flow diagram of an example of a method for transmitting segmented CV2X messages; and FIG. 9 is a process flow diagram of an example of a method for receiving segmented CV2X messages.

DETAILED DESCRIPTION

Figure 1:
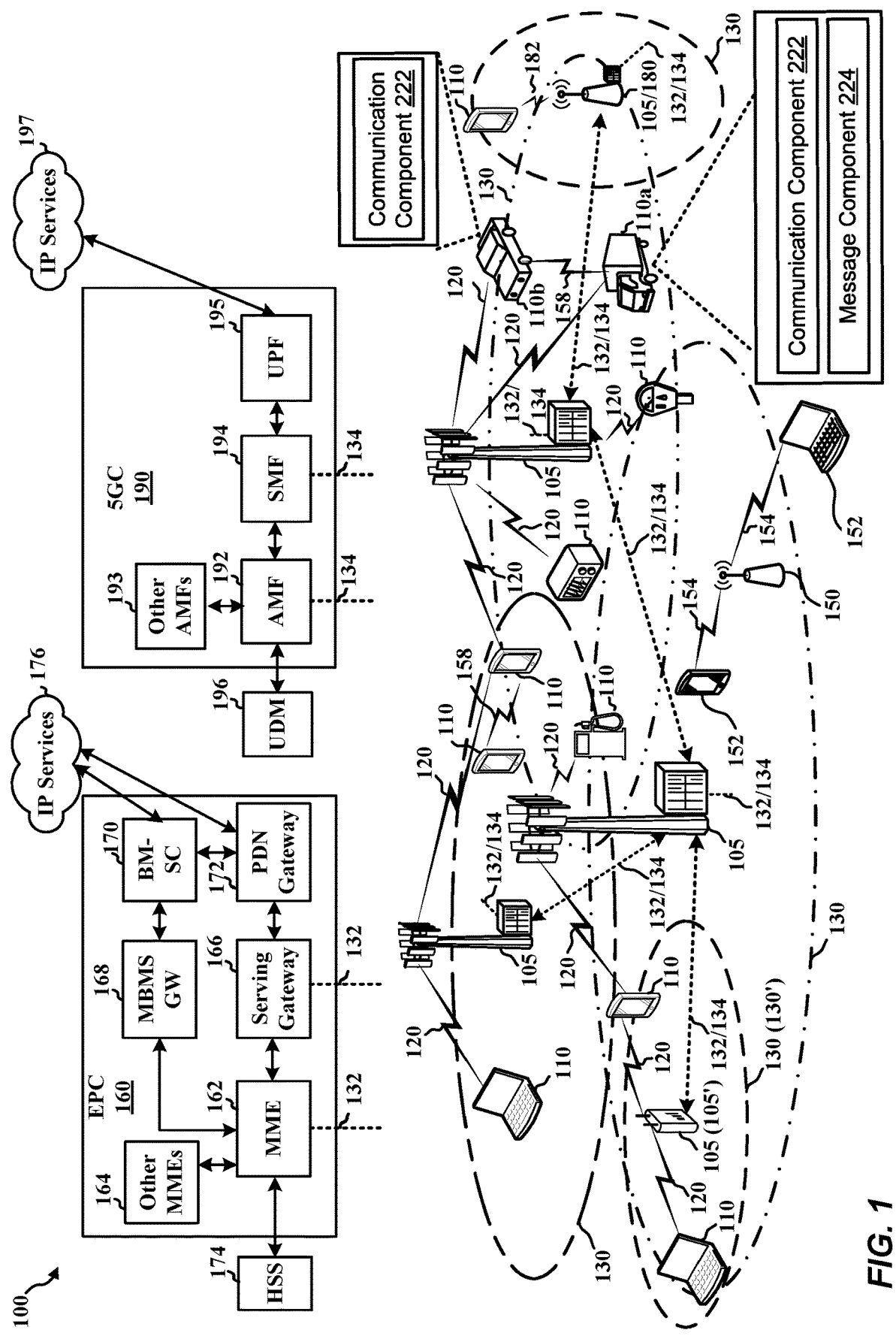
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some aspects, during CV2X communication, a transmitting UE may attempt to transmit a "long" message (e.g., greater than 200 bytes, 300 bytes, 400 bytes, 500 bytes, or longer) to a receiving UE. However, due to transmission rules at the MAC layer associated with the coding and/or modulation schemes, the transmitting UE may truncate the long message into two or more shorter messages before transmitting to the receiving UE. The transmitting UE may also transmit redundant messages (e.g., hybrid automatic repeat request scheme) of the shorter messages to increase the chance that the receive UE can properly receive and/or decode the shorter messages.

In some aspects, to minimize transmission latency, the transmitting user equipment (UE) may transmit the two or more shorter messages before transmitting the redundant messages. By transmitting the two or more shorter messages before the redundant messages, the receiving UE may be able to receive and/or decode the two or more shorter messages (and therefore the long message) before receiving the redundant messages, thereby reducing transmission latency.

FIG. 1 is a diagram illustrating an example of a wireless communications system and an access network 100. The wireless communications system (also referred to as a wireless wide area network (WWAN)) includes at least one base station (BS) 105, UEs 110, an Evolved Packet Core (EPC) 160, and a 5G Core (5GC) 190. The UEs 110 may include a transmitting UE 110a and a receiving UE 110b. The transmitting UE 110a may include a communication component 222 that transmits and receives data to/from other UEs 110 and BS 105. The transmitting UE 110a may include a message component 224 that divides an upper layer message into a plurality lower layer messages. The receiving UE 110b may include a communication component 222 that transmits and receives data to/from other UEs 110 and BS 105.

In some implementations, the BS 105 may include macro cells (high power cellular base station) and/or small cells (low power cellular base station). The macro cells include base stations. The small cells include femtocells, picocells, and microcells. A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 132, 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
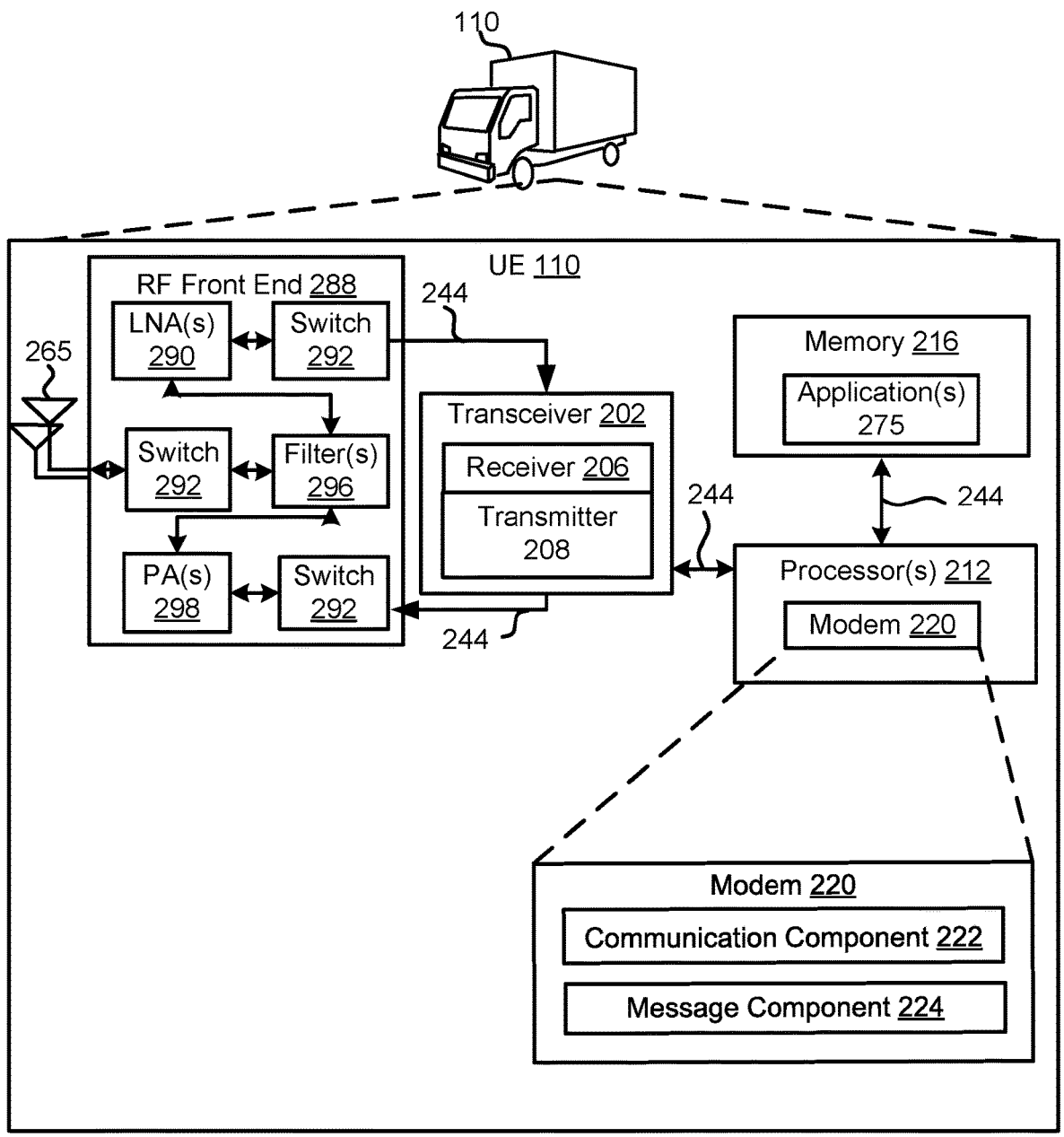
FIG. 2 is a schematic diagram of an example of a user equipment.

Referring to FIG. 2, one example of an implementation of the UE 110 may include a modem 220 having the communication component 222 and the message component 224. The communication component 222 and/or the modem 220 of the UE 110 may be configured to communicate with the BS 105 via a cellular network, a Wi-Fi network, or other wireless and wired networks. The message component 224 may configure antennas 265 or antenna ports of the UE 110 based on TCI state information associated with a codepoint. The modem 220 may receive and transmit data packets.

In some implementations, the UE 110 may include a variety of components, some of which have already been described above, but including components such as one or more processors 212 and memory 216 and transceiver 202 in communication via one or more buses 244, which may operate in conjunction with the modem 220, the communication component 222 and/or the message component 224 to enable one or more of the functions described herein related to communicating with the BS 105. Further, the one or more processors 212, modem 220, memory 216, transceiver 202, RF front end 288 and one or more antennas 265, may be configured to support voice and/or data messages (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the message component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the message component 224 and the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222 and/or the message component 224 and/or one or more of their subcomponents.

Transceiver 202 may include at least one receiver 206 and at least one transmitter 208. Receiving device 206 may include hardware, firmware, and/or software code executable by a processor for receiving data, the code comprising instructions and being stored in a memory (e.g., computer-readable medium). Receiving device 206 may be, for example, a RF receiving device. In an aspect, receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
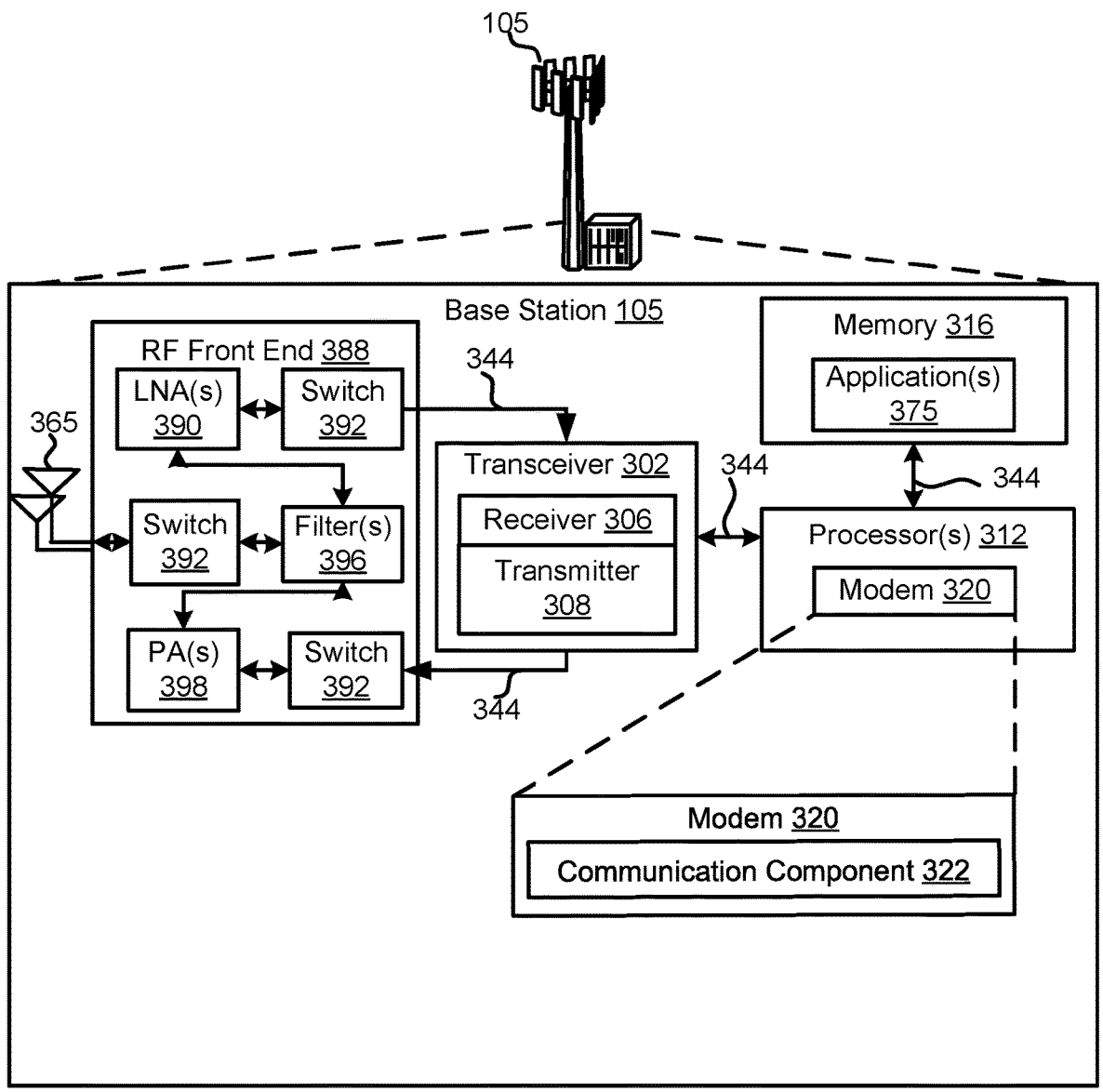
FIG. 3 is a schematic diagram of an example of a base station.

Referring to FIG. 3, one example of an implementation of the BS 105 may include a modem 320 with a communication component 322. The communication component 322 and/or the modem 320 the BS 105 may be configured to communicate with the UE 110 via a cellular network, a Wi-Fi network, or other wireless and wired networks.

In some implementations, the BS 105 may include a variety of components, some of which have already been described above, but including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 160 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of its subcomponents, and/or data associated therewith, when the BS 105 is operating at least one processor 312 to execute the communication component 322 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). Receiving device 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
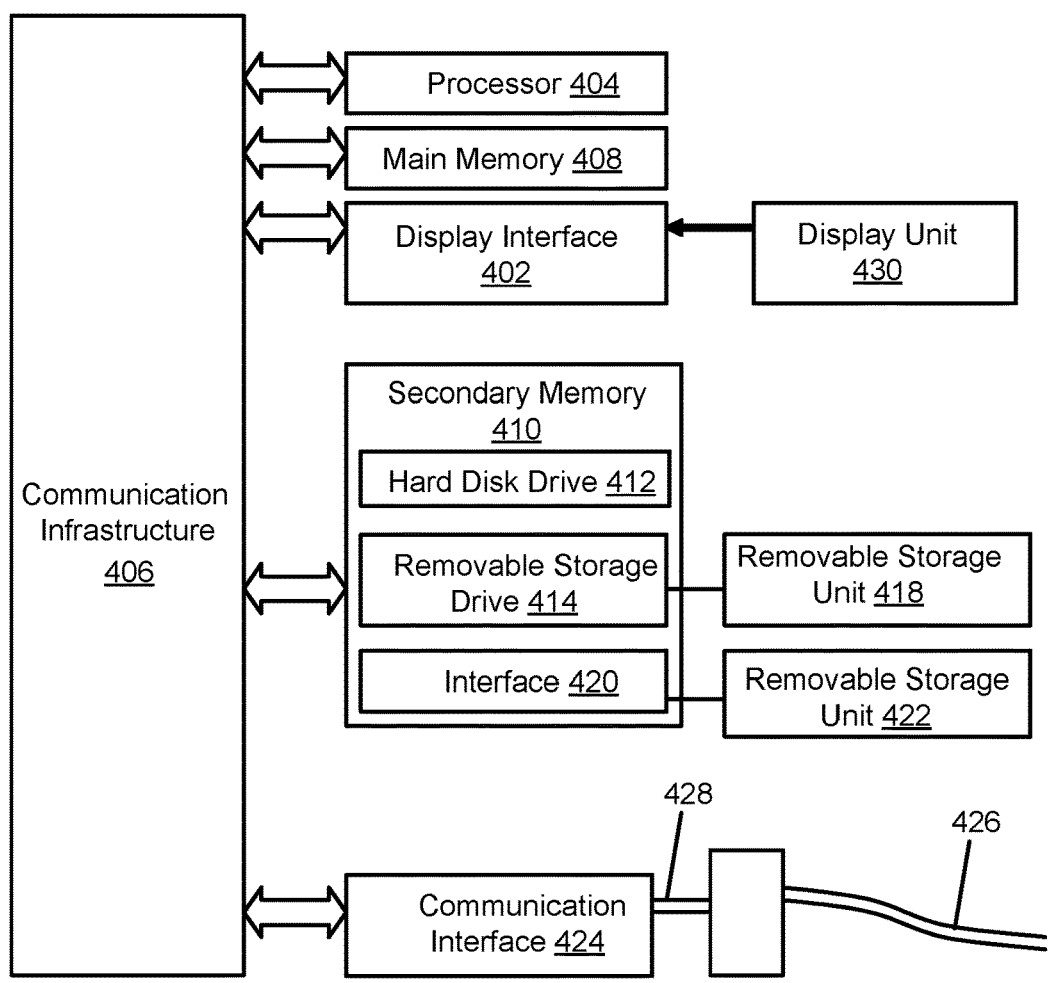
FIG. 4 is a schematic diagram of an example of a computer system for implementing a core network.

Referring now to FIG. 4, the core network 115 may be implemented as one or more core network devices, such as an example of a computer system 400. The computer system 400 may be a hardware system, a virtual system, a cloud-based system, or a combination thereof. The computer system 400 includes one or more processors, such as the processor 404. The processor 404 is communicatively coupled with a communication infrastructure 406 (e.g., a communications bus, cross-over bar, or network).

The computer system 400 may include a display interface 402 that forwards graphics, text, and other data from the communication infrastructure 406 (or from a frame buffer not shown) for display on a display unit 430. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, magnetic tape drive, optical disk drive, universal serial bus (USB) flash drive, etc. The removable storage drive 414 reads from and/or writes to a first removable storage unit 418 in a well-known manner. The first removable storage unit 418 represents a floppy disk, magnetic tape, optical disk, USB flash drive etc., which is read by and written to removable storage drive 414. As will be appreciated, the first removable storage unit 418 includes a computer usable storage medium having stored therein computer software and/or data.

Alternative aspects of the present disclosure may include secondary memory 410 and may include other similar devices for allowing computer programs or other instructions to be loaded into computer system 400. Such devices may include, for example, a second removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units (not shown) and interfaces 420, which allow software and data to be transferred from the second removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using one or more of a wire or cable, fiber optics, telephone line, cellular link, RF link and/or other communications channels. In this document, the terms "computer program medium" and "computer usable medium" are used to refer generally to media such as the first removable storage drive 418, a hard disk installed in hard disk drive 412, and signals 428. These computer program products provide software to the computer system 400. Aspects of the present disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with aspects of the present disclosure, as discussed herein. In particular, the computer programs, when executed, enable the processor 404 to perform the features in accordance with aspects of the present disclosure. Accordingly, such computer programs represent controllers of the computer system 400.

In an aspect of the present disclosure where the method is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
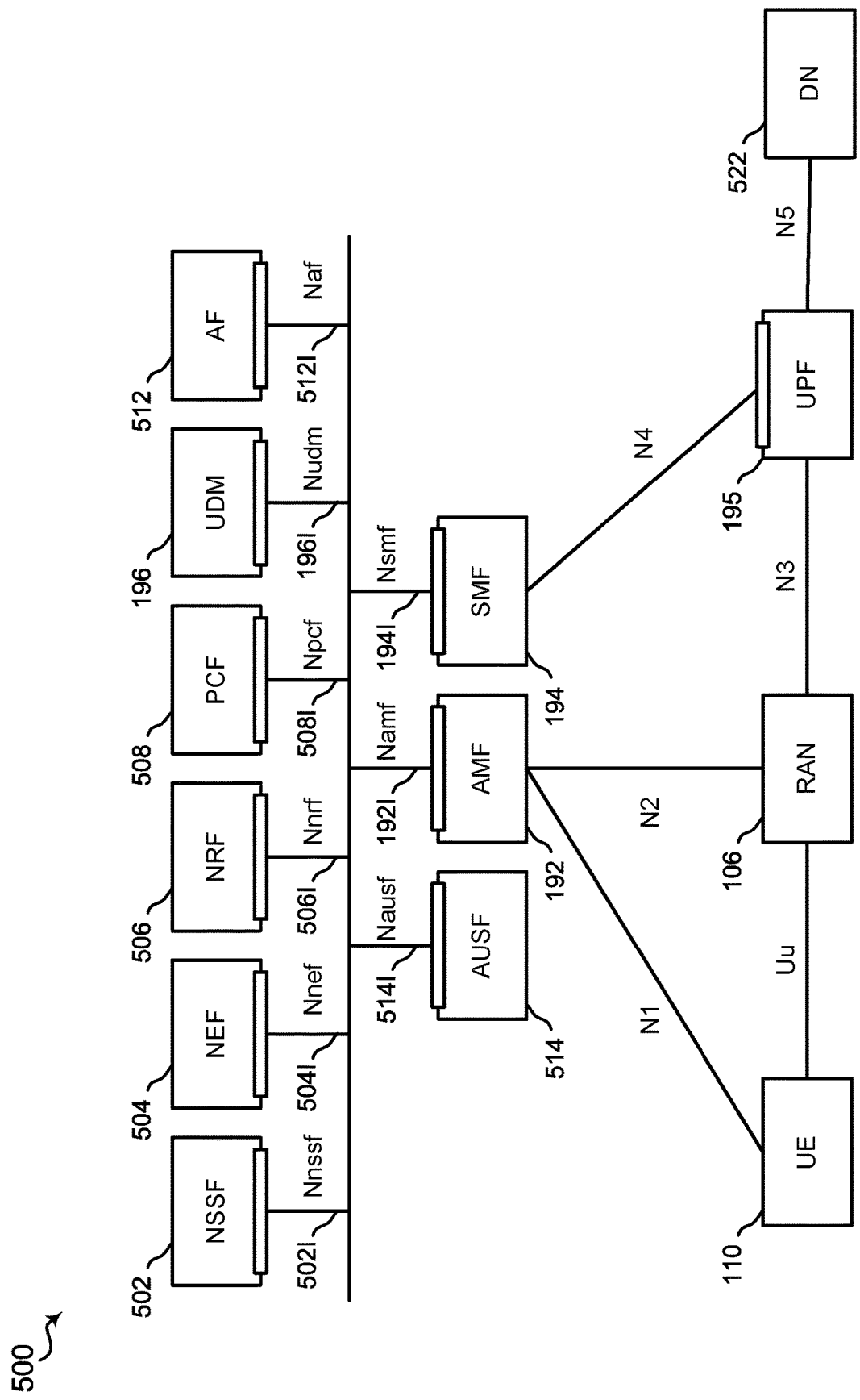
FIG. 5 is an example of a functional diagram illustrating the service-based architecture (SBA)

Turning now to FIG. 5, a service based architecture (SBA) 500 of the wireless communication network 100 may include a number of interconnected network functions (NFs). The SBA 500 may include a network slice selection function (NSSF) 502 that may support the selection of the network slice instances to serve the one or more UEs 110, and determines the allowed network slice selection assistance information and the access and mobility management function (AMF) set to be used to serve the one or more UEs 110. The NSSF 502 may communicate with other functions within the SBA 500 via a Nnssf 502I interface. The SBA 500 may include a network exposure function (NEF) 504 that may support exposure of capabilities and events, secure provision of information from external application to various wireless communication networks, and translation of internal and external information. The NEF 504 may communicate with other functions within the SBA 500 via a Nnef 504I interface.

Still referring to FIG. 5, the SBA 500 may include a network function repository function (NRF) 506 that may support service discovery functions and may maintain NF profiles and available NF instances. The NRF 506 may communicate with other functions within the SBA 500 via a Nnrf 506I interface. The SBA 500 may include a policy control function (PCF) 508 that may support unified policy framework, provide policy rules to control plane (CP) functions, access subscription information for policy decisions in unified data repository (UDP). The PCF 508 may communicate with other functions within the SBA 500 via a Npcf 508I interface.

Still referring to FIG. 5, the SBA 500 may include the UDM 196 that may support the generations of authentication and key agreement (AKA) credentials, user identification handling, access authorization, and subscription management. The UDM 196 may communicate with other functions within the SBA 500 via a Nudm 196I interface. The SBA 500 may include an application function (AF) 512 that may support application influence on traffic routing and interaction with policy framework for policy control. The AF 512 may communicate with other functions within the SBA 500 via a Naf 512I interface.

Still referring to FIG. 5, the SBA 500 may include an authentication server function (AUSF) 514 that may serve as an authentication server. The AUSF 514 may communicate with other functions within the SBA 500 via a Nausf 514I interface. The SBA 500 may include the AMF 192 that may support the termination of non-access-stratum (NAS) signaling, NAS ciphering and integrity protection, registration management, connection management, mobility management, access authentication and authorization, security context management. The AMF 192 may communicate with other functions within the SBA 500 via a Namf 192I interface. The AMF 192 may also communicate with the UE 110 via the N1 interface and a RAN 106 with the N2 interface.

The RAN 106 may be a network entity residing between the core network 115 and the UE 110. The RAN 106 may be implemented, for example, by the BS 105. The RAN 106 may relay data between the core network 115 and the UE 110.

Still referring to FIG. 5, the SBA 500 may include the SMF 194 that may support session management (session establishment, modification, release), UE internet protocol (IP) address allocation & management, dynamic host configuration protocol functions, termination of NAS signaling related to session management, downlink data notification, traffic steering configuration for UPF for proper traffic routing. The SMF 194 may communicate with other functions within the SBA 500 via a Nsmf 194I interface. The SBA 500 may include the UPF 195 that may support packet routing & forwarding, packet inspection, quality of service (QoS) handling, act as the external PDU session interface to the data network (DN) 522, and is an anchor point for both intra radio access technology (RAT) and inter-RAT mobility. The UPF 195 may communicate with the SMF 194 via a N4 interface, the DN 522 via the N5 interface, and the RAN 106 via the N3 interface.

In some implementations, the RAN 106 and the UE 110 may communicate via the Uu (wireless radio or "air") interface.

Figure 6:
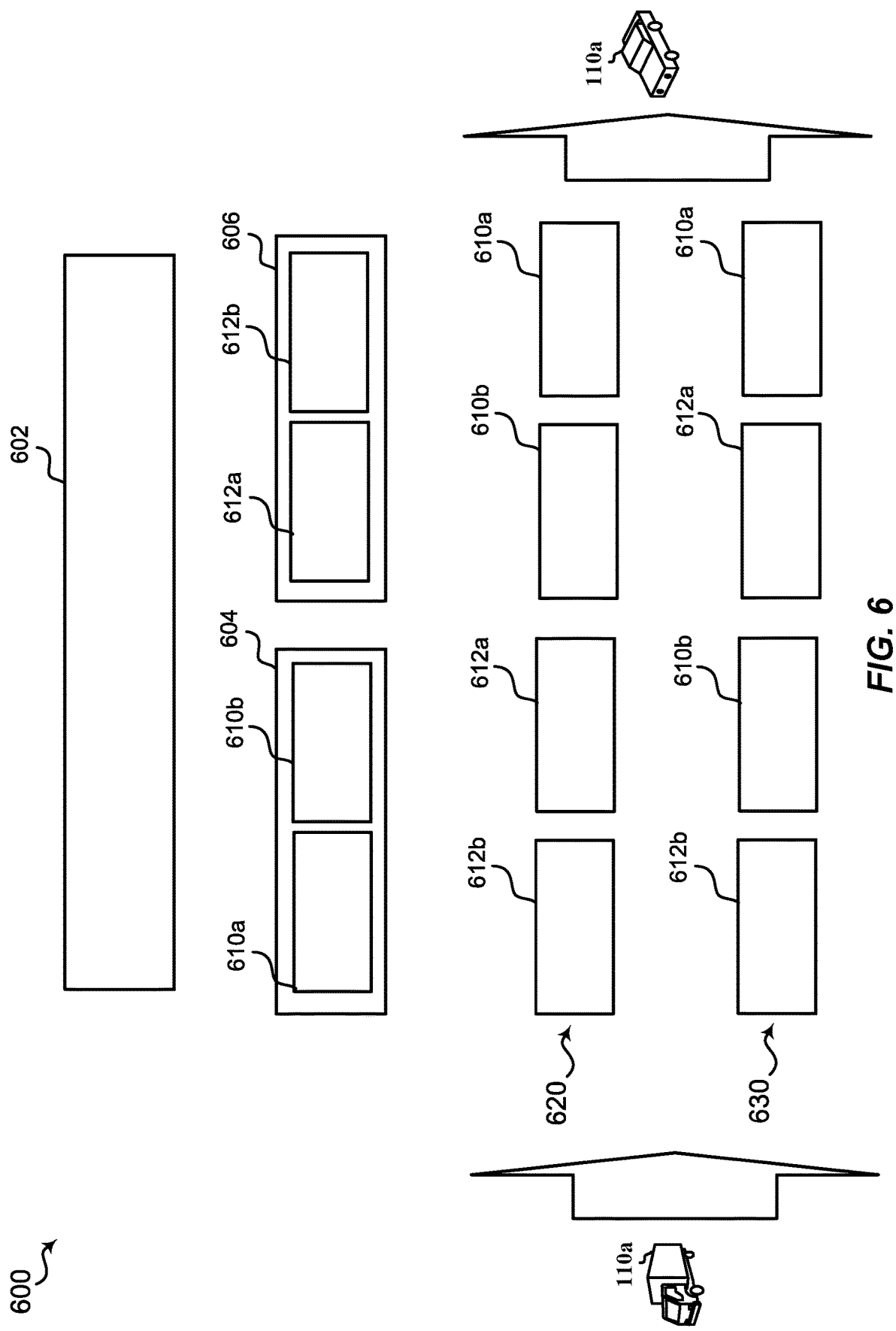
FIG. 6 is a first example of a schematic diagram for transmitting segmented CV2X messages.

Turning now to FIG. 6, an example of an environment 600 for transmitting segmented messages in CV2X communication may include a transmitting UE 110a and a receiving UE 110b. The transmitting UE 110a and the receiving UE 110b may be motor vehicles. In some implementations, the transmitting UE 110a may transmit an upper layer (e.g., a non-access stratum layer, a radio resource control layer, an application layer) message 602 to the receiving UE 110b. The upper layer message 602 may include a Basic Safety Message (BSM). The upper layer message 602 may include time-critical messages associated with road safety information (e.g., detecting a pot hole, road construction ahead, etc), driver (of the transmitting UE 110a) actions (e.g., sudden braking, swerving to avoid a deer, etc), sensor information (e.g., detecting another vehicle "running" a red light), pedestrian information (e.g., pedestrian ahead), etc. In some instances, the upper layer message 602 may be long (e.g., larger than 100 bytes, 200 bytes, 300 bytes, 400 bytes, 500 bytes, or longer). When the upper layer message 602 is handed to a lower layer (e.g., a service data adaptation protocol layer, a packet data convergence protocol layer, a radio link control access layer, or a MAC layer) for transmission, the message component 224 may convert the upper layer message 602 into a first message segment 604 and a second message segment 606. The first message segment 604 may include a first message block 610a of the first message segment 604 and a first redundant block 610b of the first message segment 604. The second message segment 606 may include a second message block 612a of the second message segment 606 and a second redundant block 612b of the second message segment 606.

In some implementations, the first message block 610a may include identical or substantially identical payload information as the first redundant block 610b. The second message block 612a may include identical or substantially identical payload information as the second redundant block 612b. The transmitting UE 110a may transmit first redundant block 610b and the second redundant block 612b along with the first message block 610a and the second message block 612a to the receiving UE 110b in case the receiving UE 110b fails to properly receive and/or decode at least one of the first message block 610a and/or the second message block 612a. In some variations, the receiving UE 110b may fail to receive and/or decode due to corrupted data packets, atmospheric interference during transmission, power fluctuation at the receiving UE 110b, etc.

In a first transmission scheme 620, the transmitting UE 110a may sequentially transmit the first message block 610a, the first redundant block 610b, the second message block 612a, and the second redundant block 612b. The receiving UE 110b may sequentially receive the first message block 610a, the first redundant block 610b, the second message block 612a, and the second redundant block 612b. As a result of the transmitting UE 110a utilizing the first transmission scheme 620, the earliest possible time for the receiving UE 110b to decode the upper layer message 602 is after receiving the second message block 612a (i.e., the third block transmitted by the transmitting UE 110a) because, after receiving the second message block 612a, the receiving UE 110b will have information in both the first message segment 604 and the second message segment 606.

In a second transmission scheme 630, the transmitting UE 110a may sequentially transmit the first message block 610a, the second message block 612a, the first redundant block 610b, and the second redundant block 612b. The receiving UE 110b may sequentially receive the first message block 610a, the second message block 612a, the first redundant block 610b, and the second redundant block 612b. As a result of the transmitting UE 110a utilizing the second transmission scheme 630, the earliest possible time for the receiving UE 110b to decode the upper layer message 602 is after receiving the second message block 612a (i.e., the second block transmitted by the transmitting UE 110a) because, after receiving the second message block 612a, the receiving UE 110b will have information in both the first message segment 604 and the second message segment 606. Therefore, when the transmitting UE 110a transmits the first message segment 604 and the second message segment 606 using the second transmission scheme 630 instead of the first transmission scheme 620, the receiving UE 110b may potentially decode the upper layer message 602 faster by up to a time to, where to is the amount of time the transmitting UE 110a takes to transmit first redundant block 610b.

In some aspects of the present disclosure, when the transmitting UE 110a utilizes the second transmission scheme 630 to transmit the first message block 610a, the second message block 612a, the first redundant block 610b, and the second redundant block 612b, the receiving UE 110b may decode the upper layer message 602 faster (e.g., 2 milliseconds (ms), 4 ms, 6 ms, 8 ms, or 10 ms) than if the transmitting UE 110a utilizes the first transmission scheme 620.

In some instances, if the receiving UE 110b is traveling at 80 miles per hour (mph), or 35.76 meters per second, the receiving UE 110b may decode the upper layer message 602 before traveling an additional 0.1 meter (m), 0.2 m, 0.5 m, or 1 m if the transmitting UE 110a utilizes the second transmission scheme 630 instead of the first transmission scheme 610.

In some implementations, each of the plurality of message blocks may be a first hybrid automatic repeat request (HARQ) block of a corresponding CV2X segment of the plurality of CV2X segments and each of the plurality of redundant message blocks may be a second HARQ block of a corresponding CV2X segment of the plurality of CV2X segments. For example, the first message block 610a may be the first HARQ block of the first message segment 604, the first redundant block 610b may be the second HARQ block of the first message segment 604, the second message block 612a may be the first HARQ block of the second message segment 606, and the second redundant block 612b may be the second HARQ block of the second message segment 606.

Figure 7:
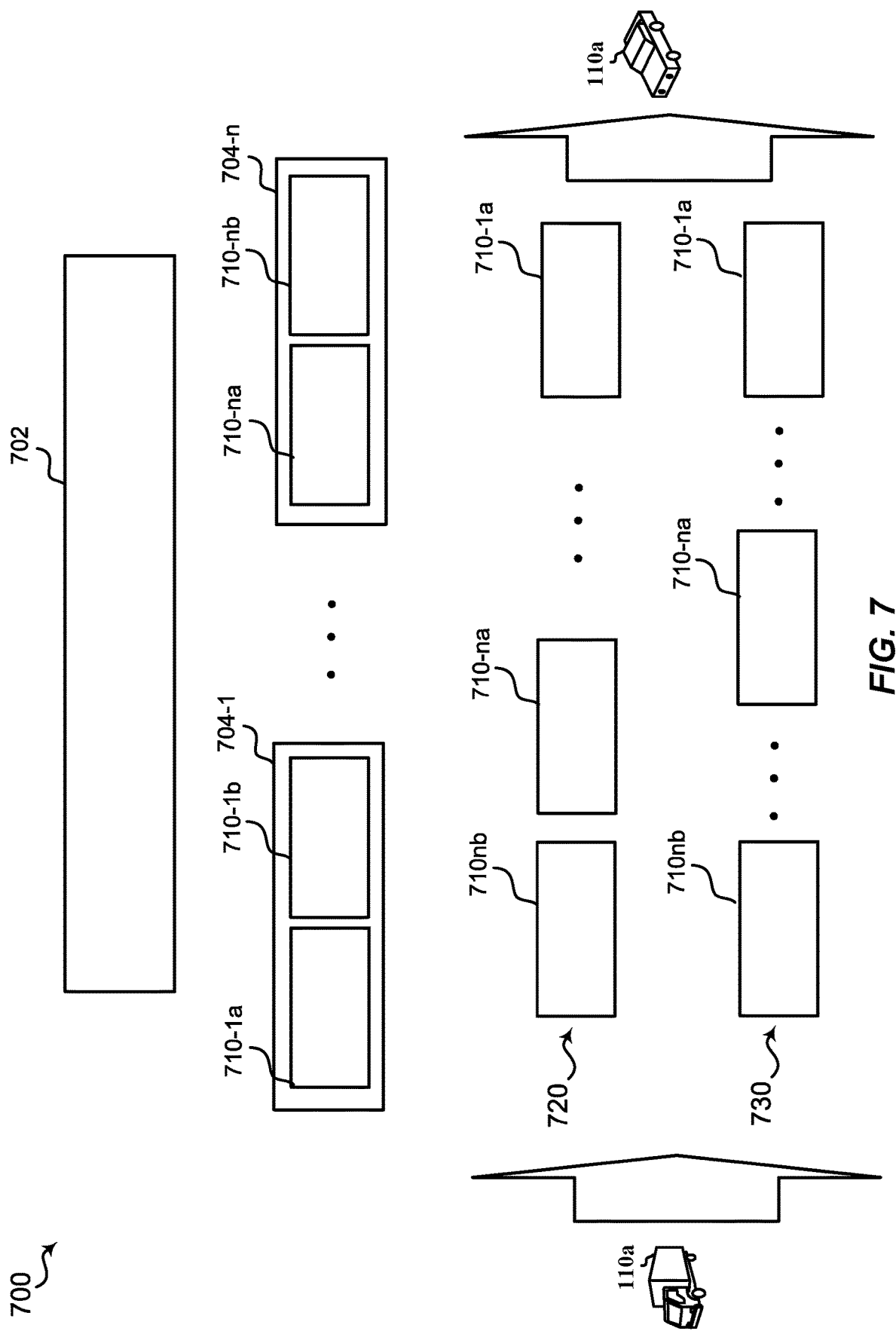
FIG. 7 is a second example of a schematic diagram for transmitting segmented CV2X messages.

Turning now to FIG. 7, another example of an environment 700 for transmitting segmented messages in CV2X communication may include a transmitting UE 110a and a receiving UE 110b. In some implementations, the transmitting UE 110a may transmit an upper layer (e.g., application layer) message 702 to the receiving UE 110b. When the upper layer message 702 is handed to a lower layer (e.g., MAC layer) for transmission, the message component 224 may convert the upper layer message 702 into a first message segment 704-1, a second message segment 704-2, ..., an $n^{th}$ message segment 704-n (i.e., n message segments). The first message segment 704 may include a first message block 710-1a of the first message segment 704-1 and a first redundant block 710-1b of the first message segment 704-1, the second message segment 704-2 may include a second message block 710-2a of the second message segment 704-2 and a second redundant block 710-2b of the second message segment 704-2, and so forth.

In a first transmission scheme 720, the transmitting UE 110a may sequentially transmit the first message block 710-1a, the first redundant block 710-1b, the second message block 710-2a, and the second redundant block 710-2b, ..., the $n^{th}$ message block 710-na, and the $n^{th}$ redundant block 710-nb. The receiving UE 110b may sequentially receive the first message block 710-1a, the first redundant block 710-1b, the second message block 710-2a, and the second redundant block 710-2b, ..., the $n^{th}$ message block 710-na, and the $n^{th}$ redundant block 710-nb. As a result of the transmitting UE 110a utilizing the first transmission scheme 720, the earliest possible time for the receiving UE 110b to decode the upper layer message 702 is after receiving the $n^{th}$ message block 710-na (i.e., the $(2n-1)^{th}$ block transmitted by the transmitting UE 110a) because, after receiving the $n^{th}$ message block 710-na, the receiving UE 110b will have information in the first message segment 704-1, the second message segment 704-2, ..., and the $n^{th}$ message segment 704-n.

In a second transmission scheme 730, the transmitting UE 110a may sequentially transmit the first message block 710-1a, the second message block 710-2a, ..., the $(n-1)^{th}$ redundant block 710-$(n-1)$b, and the $n^{th}$ message redundant block 710-nb. The receiving UE 110b may sequentially receive the first message block 710-1a, the second message block 710-2a, ..., the $(n-1)^{th}$ redundant block 710-$(n-1)$b, and the $n^{th}$ redundant block 710-nb. As a result of the transmitting UE 110a utilizing the first transmission scheme 720, the earliest possible time for the receiving UE 110b to decode the upper layer message 702 is after receiving the $n^{th}$ message block 710-na (i.e., the $n^{th}$ block transmitted by the transmitting UE 110a) because, after receiving the $n^{th}$ message block 710-na, the receiving UE 110b will have information in the first message segment 704-1, the second message segment 704-2, ..., and the $n^{th}$ message segment 704-n. Therefore, when the transmitting UE 110a transmits the first message segment 704-1, the second message segment 704-2, ..., and the $n^{th}$ message segment 704-n using the second transmission scheme 730 instead of the first transmission scheme 720, the receiving UE 110b may potentially decode the upper layer message 702 faster by up to a time $t_1$, where $t_1$ is the amount of time the transmitting UE 110a takes to transmit the first redundant block 7101b, the second redundant block 710 ... the $(n-1)^{th}$ redundant block 710-$(n-1)$b.

Referring to FIG. 8, an example of a method 800 for transmitting segmented CV2X messages may be performed by the transmitting UE 110a in the wireless communication network 100.

At block 805, the method 800 may generate a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks. For example, the message component 224 may generate the first message segment 604 and the second message segment 606 from the upper layer message 602. The first message segment 604 may include the first message block 610a and the first redundant block 610b. The second message segment 606 may include the second message block 612a and the second redundant block 612b.

At block 810, the method 800 may transmit the plurality of message blocks to a receiving UE. For example, the communication component 222 of the transmitting UE 110a may transmit the first message block 610a and the second message block 612a to the receiving UE 110b.

At block 815, the method 800 may transmit the plurality of redundant blocks to the receiving UE after transmitting the plurality of message blocks. For example, the communication component 222 of the transmitting UE 110a may transmit the first redundant block 610b and the second redundant block 612b to the receiving UE 110b.

Referring to FIG. 9, an example of a method 900 for receiving segmented CV2X messages may be performed by the receiving UE 110b in the wireless communication network 100.

At block 905, the method 900 may receive a plurality of cellular vehicle-to-everything (CV2X) message blocks from a transmitting UE. For example, the communication component 222 of the receiving UE 110b may receive the first message block 610a and the second message block 612a from the transmitting UE 110a.

At block 910, the method 900 may receive a plurality of CV2X redundant blocks from the transmitting UE after receiving the plurality of CV2X message blocks. For example, the communication component 222 of the receiving UE 110b may receive the first redundant block 610b and the second redundant block 612b from the transmitting UE 110a.

At block 915, the method 900 may generate an upper level message at a first layer based on at least on the plurality of CV2X message blocks or the plurality of CV2X redundant blocks. For example, as a result of the transmitting UE 110a utilizing the first transmission scheme 720, the earliest possible time for the receiving UE 110b to decode the upper layer message 702 is after receiving the $n^{th}$ message block 710-na (i.e., the $n^{th}$ block transmitted by the transmitting UE 110a) because, after receiving the $n^{th}$ message block 710-na, the receiving UE 110b will have information in the first message segment 704-1, the second message segment 704-2, . . . , and the $n^{th}$ message segment 704-n. Therefore, when the transmitting UE 110a transmits the first message segment 704-1, the second message segment 704-2, . . . , and the $n^{th}$ message segment 704-n using the second transmission scheme 730 instead of the first transmission scheme 720, the receiving UE 110b may potentially decode the upper layer message 702 faster by up to a time $t_1$, where $t_1$ is the amount of time the transmitting UE 110a takes to transmit the first redundant block 7101b, the second redundant block 710 . . . the $(n-1)^{th}$ redundant block 710-(n−1)b.

ADDITIONAL IMPLEMENTATIONS

A method of wireless communication by a transmitting user equipment (UE), comprising generating a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks transmitting the plurality of message blocks to a receiving UE and transmitting the plurality of redundant blocks to the receiving UE after transmitting the plurality of message blocks.

Any of the method above, wherein the first layer is a medium access control (MAC) layer and the second layer is an application layer.

Any of the method above, wherein the second layer includes at least one of a non-access stratum layer or a radio resource control layer.

Any of the method above, wherein the first layer includes at least one of a service data adaptation protocol layer, a packet data convergence protocol layer, a radio link control access layer, or a MAC layer.

Any of the method above, wherein each of the plurality of message blocks is a first hybrid automatic repeat request (HARQ) block of a corresponding CV2X segment of the plurality of CV2X segments and each of the plurality of redundant message blocks is a second HARQ block of a corresponding CV2X segment of the plurality of CV2X segments.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a transmitting user equipment (UE), comprising:
    generating a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks;
    transmitting, to a receiving UE, the plurality of message blocks; and
    transmitting, to the receiving UE, the plurality of redundant blocks corresponding to the plurality of message blocks after transmitting the plurality of message blocks, wherein each of the plurality of message blocks is a first hybrid automatic repeat request (HARQ) block of a corresponding CV2X segment of the plurality of CV2X segments and each of the plurality of redundant blocks is a second HARQ block of a corresponding CV2X segment of the plurality of CV2X segments.

2. The method of claim 1, wherein the first layer is a medium access control (MAC) layer and the second layer is an application layer.

3. The method of claim 1, wherein the second layer includes at least one of a non-access stratum layer or a radio resource control layer.

4. The method of claim 1, wherein the first layer includes at least one of a service data adaptation protocol layer, a packet data convergence protocol layer, a radio link control access layer, or a MAC layer.

5. A transmitting user equipment (UE), comprising:
    a memory comprising instructions;
    a transceiver; and
    one or more processors operatively coupled with the memory and the transceiver, the one or more processors configured to execute the instructions to:
        generate a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks;
        transmit, via the transceiver, the plurality of message blocks to a receiving UE; and
        transmit, via the transceiver to the receiving UE, the plurality of redundant blocks corresponding to the plurality of message blocks after transmitting the entire plurality of message blocks, wherein each of the plurality of message blocks is a first hybrid automatic repeat request (HARQ) block of a corresponding CV2X segment of the plurality of CV2X segments and each of the plurality of redundant blocks is a second HARQ block of a corresponding CV2X segment of the plurality of CV2X segments.

6. The transmitting UE of claim 5, wherein the first layer is a medium access control (MAC) layer and the second layer is an application layer.

7. The transmitting UE of claim 5, wherein the second layer includes at least one of a non-access stratum layer or a radio resource control layer.

8. The transmitting UE of claim 5, wherein the first layer includes at least one of a service data adaptation protocol layer, a packet data convergence protocol layer, a radio link control access layer, or a MAC layer.

9. A non-transitory computer readable medium having instructions stored therein that, when executed by one or more processors of a transmitting user equipment (UE), cause the one or more processors to:
generate a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks;
transmit, to a receiving UE, the plurality of message blocks; and
transmit, to the receiving UE, the plurality of redundant blocks corresponding to the plurality of message blocks after transmitting the plurality of message blocks, wherein each of the plurality of message blocks is a first hybrid automatic repeat request (HARQ) block of a corresponding CV2X segment of the plurality of CV2X segments and each of the plurality of redundant blocks is a second HARQ block of a corresponding CV2X segment of the plurality of CV2X segments.

10. The non-transitory computer readable medium of claim 9, wherein the first layer is a medium access control (MAC) layer and the second layer is an application layer.

11. The non-transitory computer readable medium of claim 9, wherein the second layer includes at least one of a non-access stratum layer or a radio resource control layer.

12. The non-transitory computer readable medium of claim 9, wherein the first layer includes at least one of a service data adaptation protocol layer, a packet data convergence protocol layer, a radio link control access layer, or a MAC layer.

13. A transmitting user equipment (UE), comprising:
means for generating a plurality of cellular vehicle-to-everything (CV2X) message segments at a first layer based on an upper layer message at a second layer, wherein each message segment of the plurality CV2X message segments includes a message block of a plurality of message blocks and a redundant block of a plurality of redundant blocks;
means for transmitting the plurality of message blocks to a receiving UE; and
means for transmitting, to the receiving UE, the plurality of redundant blocks corresponding to the plurality of message blocks after transmitting the plurality of message blocks, wherein each of the plurality of message blocks is a first hybrid automatic repeat request (HARQ) block of a corresponding CV2X segment of the plurality of CV2X segments and each of the plurality of redundant blocks is a second HARQ block of a corresponding CV2X segment of the plurality of CV2X segments.

14. The transmitting UE of claim 13, wherein the first layer is a medium access control (MAC) layer and the second layer is an application layer.

15. The transmitting UE of claim 13, wherein the second layer includes at least one of a non-access stratum layer or a radio resource control layer.

16. The transmitting UE of claim 13, wherein the first layer includes at least one of a service data adaptation protocol layer, a packet data convergence protocol layer, a radio link control access layer, or a MAC layer.

* * * * *